(12) United States Patent
Dean et al.

(10) Patent No.: US 6,385,822 B1
(45) Date of Patent: May 14, 2002

(54) APPARATUS FOR SECURING ARTICLES TO A VEHICLE-MOUNTED RACK

(75) Inventors: Gregory A. Dean, McKinleyville; Scott R. Allen; Joseph J. Settelmayer, both of Fieldbrook, all of CA (US)

(73) Assignee: Yakima Products, Inc., Arcata, CA (US)

( * ) Notice: Subject to any disclaimer, the term of this patent is extended or adjusted under 35 U.S.C. 154(b) by 0 days.

(21) Appl. No.: 09/552,999

(22) Filed: Apr. 19, 2000

Related U.S. Application Data

(63) Continuation of application No. 09/280,504, filed on Mar. 29, 1999, now Pat. No. 6,164,507.

(51) Int. Cl.[7] .............................. A44F 1/00; A44B 11/25
(52) U.S. Cl. .............................. 24/633; 24/634; 24/637; 24/572.1
(58) Field of Search .................... 24/633, 625, 634, 24/636, 137, 644, 573.1; 224/460, 463, 324, 568

(56) References Cited

U.S. PATENT DOCUMENTS

| | | |
|---|---|---|
| 303,686 A | 8/1884 | Whitney |
| 355,107 A | 12/1886 | Scollay |
| 688,677 A | 12/1901 | Paddock |
| 739,963 A | 9/1903 | Westlen |
| 969,195 A | 9/1910 | Rothstein |
| 1,055,665 A | 3/1913 | Schmidt |
| 1,483,853 A | 2/1924 | Schwerd |
| 2,844,856 A | 7/1958 | Mueller et al. |
| 2,889,165 A | 6/1959 | Zientara |
| 3,046,056 A | 7/1962 | Greene et al. |
| 3,184,880 A | 5/1965 | Ratte |
| 3,276,085 A | 10/1966 | Spranger |
| 3,484,908 A | 12/1969 | Lamb |

(List continued on next page.)

FOREIGN PATENT DOCUMENTS

GB 2 220344 A 1/1990

Primary Examiner—Robert J. Sandy
(74) Attorney, Agent, or Firm—Kolisch Hartwell Dickinson McCormack & Heuser

(57) ABSTRACT

An apparatus for securing articles to a vehicle-mounted rack. The apparatus includes at least one flexible strap associated with the rack. The strap is positionable around an article supported by the rack. A clamping buckle is adapted to receive and clamp onto the strap. A protective housing is adapted to receive and at least partially cover the buckle to protect the article and the vehicle from damage. In one embodiment, the strap may be attached to the housing to prevent the housing from being separated from the strap. In another embodiment, the housing may include one or more apertures to allow a user to operate the buckle when it is covered by the housing.

12 Claims, 6 Drawing Sheets

U.S. PATENT DOCUMENTS

| | | |
|---|---|---|
| 3,708,838 A | 1/1973 | Gonzalez |
| 3,735,455 A | 5/1973 | Hauser |
| 4,179,869 A | 12/1979 | Horst et al. |
| 4,502,194 A | 3/1985 | Morris et al. |
| 4,624,033 A * | 11/1986 | Orton .......................... 24/633 |
| 4,631,784 A | 12/1986 | Fildan |
| 4,674,303 A * | 6/1987 | Salcone, II ............... 24/633 X |
| 4,675,954 A | 6/1987 | Gullickson |
| 4,731,912 A | 3/1988 | Boriskie et al. |
| 4,848,794 A | 7/1989 | Mader et al. |
| 4,878,277 A | 11/1989 | Portuese |
| 4,939,824 A | 7/1990 | Reed |
| 4,961,251 A | 10/1990 | Smith |
| 4,987,662 A * | 1/1991 | Haffey et al. ................. 24/633 |
| 5,003,672 A | 4/1991 | Randall |
| 5,098,162 A | 3/1992 | Forget et al. |
| 5,129,129 A | 7/1992 | Collins et al. |
| 5,189,767 A | 3/1993 | Reitsma |
| 5,307,544 A | 5/1994 | Quarberg et al. |
| 5,332,179 A | 7/1994 | Kuffel et al. |
| 5,416,957 A | 5/1995 | Renzi, Sr. et al. |
| 5,442,840 A | 8/1995 | Ewald |
| 5,448,805 A | 9/1995 | Allen et al. |
| 5,617,617 A | 4/1997 | Gustin |
| 6,023,821 A | 2/2000 | Murray |
| 6,041,480 A * | 3/2000 | White ........................ 24/633 |
| 6,164,507 A * | 12/2000 | Dean et al. ................. 224/324 |

* cited by examiner

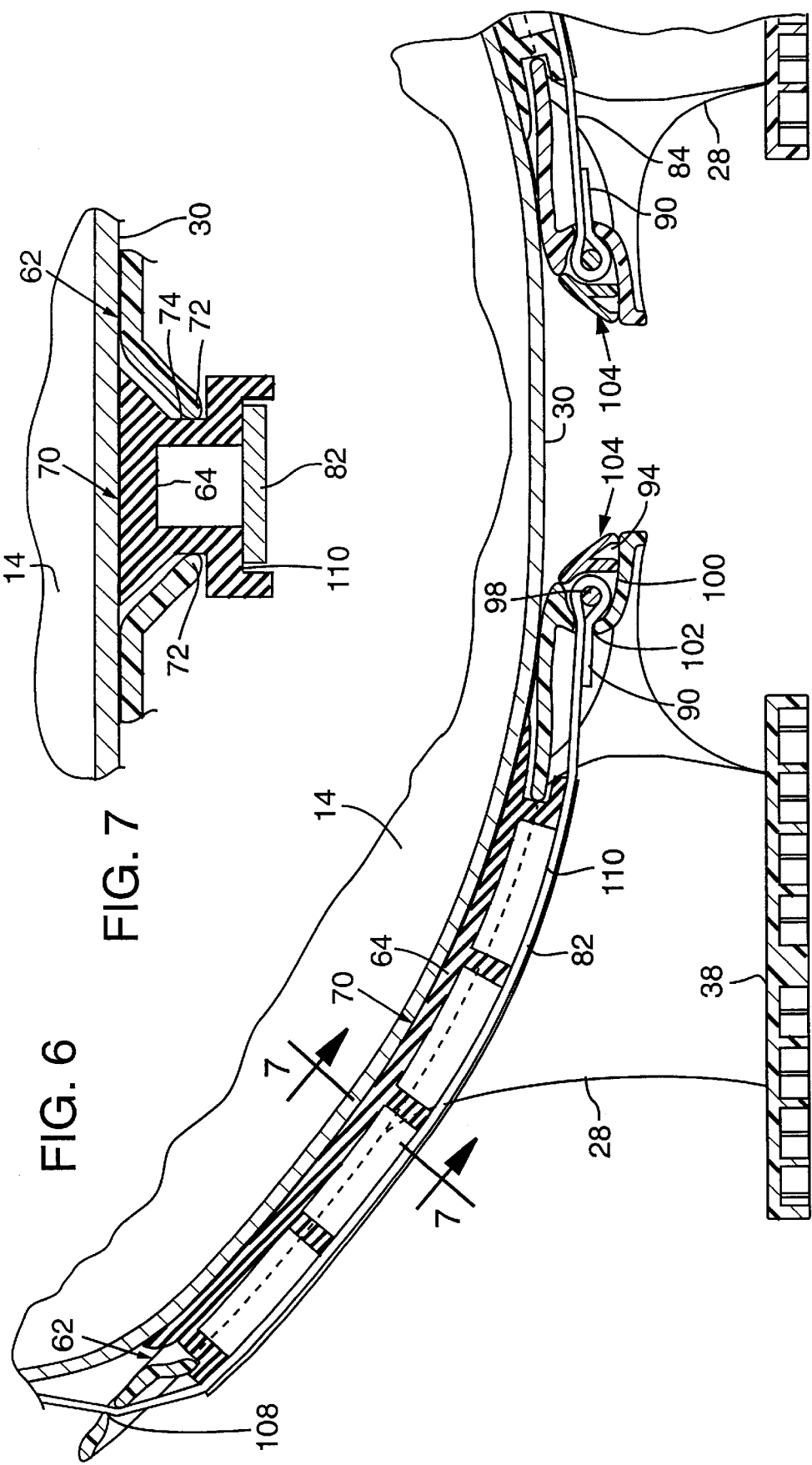

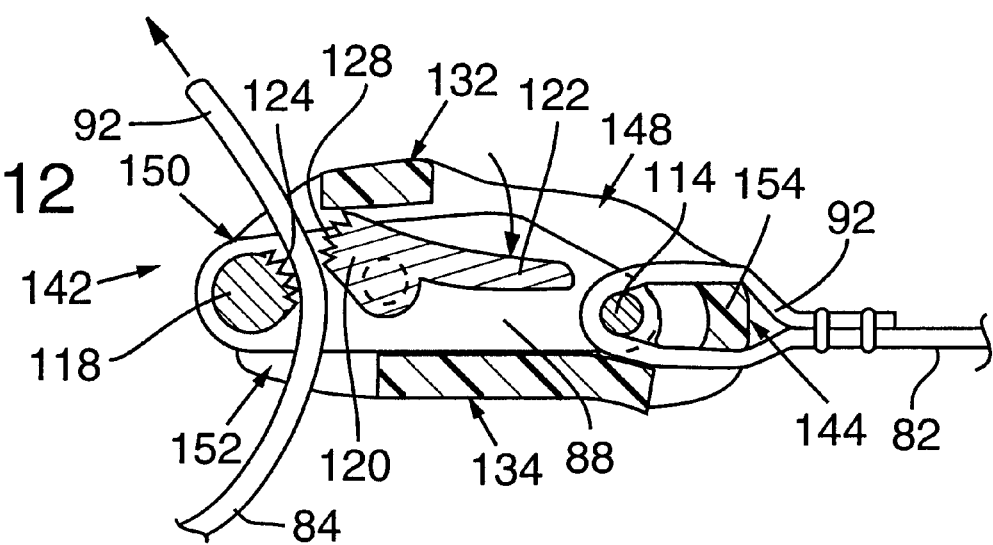

APPARATUS FOR SECURING ARTICLES TO A VEHICLE-MOUNTED RACK

CROSS REFERENCE TO RELATED APPLICATION

This application is a continuation application of U.S. patent application Ser. No. 09/280,504 filed Mar. 29, 1999 titled "Boat Rack with Selectively Engageable Gripping Surface", now issued as U.S. Pat. No. 6,164,507 on Dec. 26, 2000.

FIELD OF THE INVENTION

The present invention relates to vehicle-mounted racks, and more particularly to an apparatus for securing articles to a vehicle-mounted rack.

BACKGROUND

Recreational equipment including canoes, kayaks, bicycles, skis, etc., as well as other articles are often carried on vehicle-mounted racks. Such articles may be secured to the racks in a variety of ways to prevent the articles from being dislodged during movement of the vehicle. For example, flexible straps may be anchored to the rack and positioned around the articles. Buckles may be used to hold the straps tightly around the articles. However, the buckles typically are constructed of a rigid material which may cause damage to the articles and/or the vehicle.

SUMMARY

The invention provides an apparatus for securing articles to a vehicle-mounted rack. The apparatus includes at least one flexible strap associated with the rack. The strap is positionable around an article supported by the rack. A clamping buckle is adapted to receive and clamp onto the strap. A protective housing is adapted to receive and at least partially cover the buckle to protect the article and the vehicle from damage. In one embodiment, the strap may be attached to the housing to prevent the housing from being separated from the strap. In another embodiment, the housing may include one or more apertures to allow a user to operate the buckle when it is covered by the housing.

BRIEF DESCRIPTION OF THE DRAWINGS

FIG. 6 is a cross-sectional view similar to FIG. 4, but showing the strap tightened around the boat and forcing the pressure pad into the protruding position in contact with the hull of the boat.

FIG. 7 is an enlarged, partial view taken substantially along line 7—7 of FIG. 6, showing the boat supported by the support surface and the pressure pad moved to the protruding position in contact with the hull of the water craft.

FIG. 12 is similar to FIG. 11 but shows the buckle partially removed from the protective housing.

DETAILED DESCRIPTION

Figure 1:
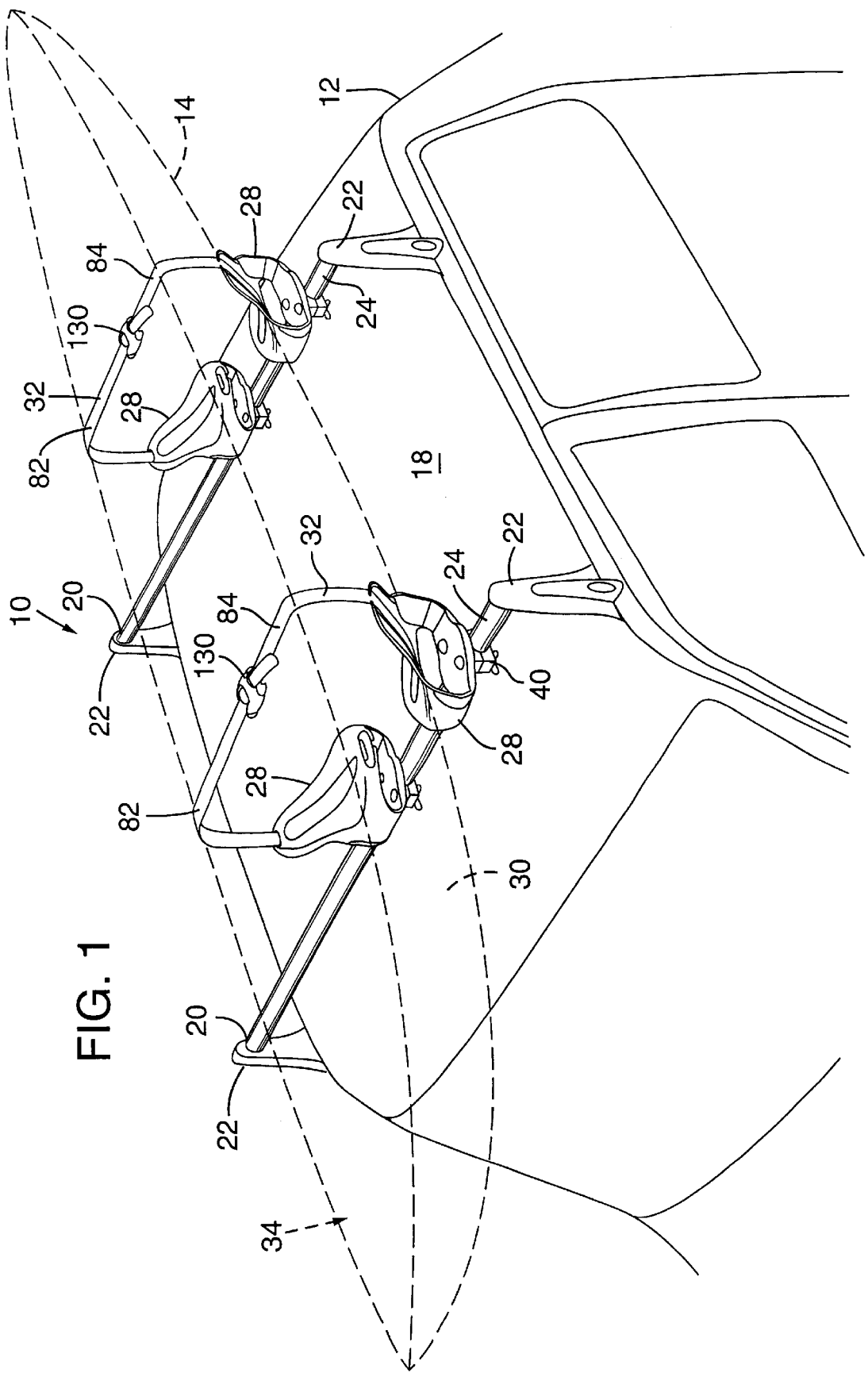
FIG. 1 is a perspective view of the invented boat rack mounted on the roof rack of a car, where the car is shown in fragmentary view and the boat is indicated by dashed lines.

A boat rack apparatus for carrying a boat or other water craft adjacent a vehicle is shown generally at 10 in FIG. 1. Apparatus 10 is configured to support a water craft 14 adjacent a vehicle 12 during operation of the vehicle. Typically, the invented apparatus attaches to vehicle 12 adjacent the roof 18 of the vehicle. Alternatively, apparatus 10 may be attached along the sides or rear of the vehicle. As a further alternative, apparatus 10 may be attached to a trailer (not shown), which is pulled behind the vehicle. Vehicle 12 may be a car, truck, van, or other type of vehicle suited to carry the weight of water craft 10.

It will be appreciated that water craft 14 may be a boat, a canoe, a kayak, a rowing shell, a surfboard, or any other type of water craft which may be transported on a vehicle. For clarity, the description below refers to water craft 14 as a boat, but it will be understood that the description includes any of these other water craft. Alternatively, apparatus 10 may be configured for carrying other articles on a vehicle.

Apparatus 10 is typically attached to a roof rack 20 mounted on the roof 18 of vehicle 12. In the depicted embodiment, roof rack 20 includes a plurality of towers mounted on either side of vehicle roof 18. Substantially cylindrical crossbars 24 are attached to opposing towers and extend laterally over the roof of the vehicle. The towers and crossbars are configured to support various types of cargo including sports equipment, cargo containers, etc. While one specific roof rack has been described, it will be appreciated that there are many suitable roof racks well known in the art and available for purchase and mounting on virtually any type of vehicle. The invented apparatus is adapted for mounting on any of these various roof racks.

Apparatus 10 includes one or more mounts 28 attachable to roof rack 20 adjacent vehicle roof 18. Typically, four mounts are used and are disposed on either side of the boat on a forward crossbar and a rearward crossbar. Alternatively, fewer or more mounts may be used. The mounts are preferably disposed on the roof rack to support the boat in a stable position to prevent it from falling. However, it will be appreciated that the precise positioning of the mounts will vary with the type, size, shape, and center of gravity of the water craft being carried.

Boat 14 is usually loaded onto the mounts with the hull 30 facing downward to contact the mounts. One or more securing members 32 are connected to extend at least partially over the deck 34 of the boat and hold the boat against the mounts during operation of the vehicle. In an alternative embodiment, boat 14 is loaded onto the mounts with the deck facing downward and the securing member extends at least partially over the hull of the boat. As a further alternative, securing member 32 may be coupled to the sides or ends of boat 14. In any event, securing member 32 is connected to hold the boat securely against mounts 28 so that the boat will not be dislodged from the mounts during operation of the vehicle at freeway speeds and under various weather conditions.

Figure 2:
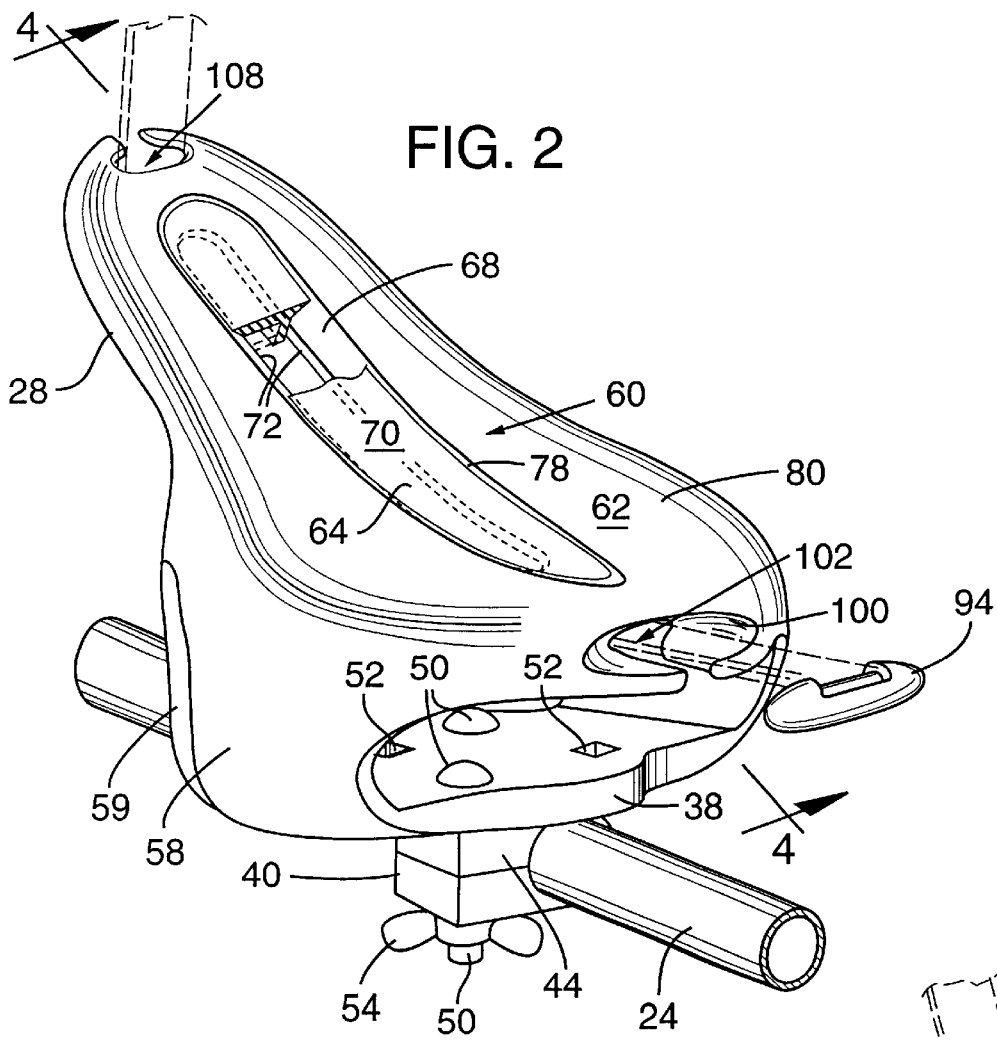
FIG. 2 is a front-left isometric view of a mount according to the present invention, showing the attachment of the mount to the roof rack and the pressure pad partially cut away to show its placement in the slot. The strap, which is shown in dashed lines, is connected to the cleat.
Figure 3:
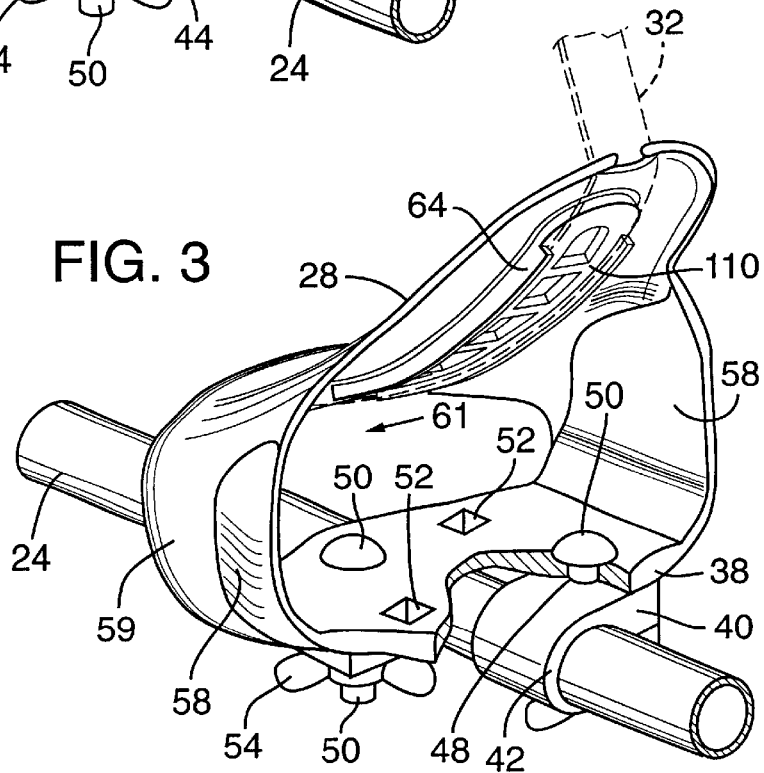
FIG. 3 is rear-right isometric view of the mount of FIG. 2, with the base partially cut away to show the connector. The strap is shown disposed within the channel of the pressure pad.

As shown in FIGS. 2 and 3, each mount 28 includes a base 38 configured for attachment to roof rack 20. One or more connectors 40 are provided to engage base 38 and couple the mount to roof rack 20. In the depicted embodiment, each connector 40 includes a clamp 42 adapted to fit around a crossbar 24. It will be appreciated that clamp 42 may be formed to have other shapes as required to conform to the crossbars. The ends of the clamp form arms 44 so that the diameter of clamp 42 is adjustable by moving arms 44 closer or further apart. Each arm has a hole 48 sized to receive a bolt 50. A corresponding hole 52 is formed in base 38 of the mount so that bolt 50 may extend through hole 52 and through holes 48 to be received by wing nut 54. When wing nut 54 is tightened, arms 44 move closer together, causing clamp 42 to grip the crossbar. Mount 28 is rigidly held against the connector by bolt 50. Preferably, connectors 40 are sufficiently flexible so that the arms can be spread apart to snap over the crossbars. In addition, wing nut 54 is preferably configured to allow hand-tightening of the clamp.

It will be appreciated that while one type of connector 40 has been described above, there are many different connectors well known in the art which may also be used as required for compatibility with the particular roof rack. Thus, the invented boat rack is not limited to a specific connector. In the depicted embodiment, base 38 includes four holes 52 to allow the mount to be coupled to a variety of different connectors. In addition, two connectors are typically used for each mount to provide maximum stability.

Mounts 28 also include a pair of side walls 58 which extend generally upward from either side of base 38 to join a water craft support region 60, which is spaced above the base. The sides may include vents 59 to provide increased rigidity to the mount. The base, sides, and support region form a conduit 61 beneath the support region.

In the depicted embodiment, support region 60 includes a support surface 62, and a pressure pad 64 which is disposed in a slot 68 in the support region. Support surface 62 is typically concave in a direction transverse to the elongate axis of the boat. Each mount is preferably positioned on the roof rack so that the support surface approximately conforms to the shape of hull 30. Support surface 62 is preferably constructed of a smooth, relatively low-friction material to slidably receive the boat. In one embodiment, support surface 62 is constructed of nylon or similar UV-resistant, plastic material. Alternatively, support surface 62 may be constructed of any material suitable to support the boat adjacent the vehicle.

Pressure pad 64 includes a side-wall groove 74 adapted to fit around edges 72 of slot 68. The width of side-wall groove 74 is larger than the thickness of edges 72 so that the pressure pad may move relative to the support surface. In the depicted embodiment, edges 72 are disposed below the support surface. Thus, when the pressure pad is not biased upward, it hangs recessed within the slot due to gravity. Conversely, when the pressure pad is biased upward, it protrudes above the edges of the slot.

In one embodiment, pressure pad 64 includes a gripping surface 70 which has a higher coefficient of friction than support surface 62. In this embodiment, pressure pad 64 acts as a gripping pad, which is selectively engageable with the boat to restrain the boat from sliding across the support surface. When the pressure pad is in the recessed position, it is spaced away from the boat and the boat may be slid across the support surfaces for loading and unloading. Once the boat is properly positioned on the mount, the pressure pad may be moved to the protruding position where the gripping surface 70 is in contact with the hull of the boat. When the pressure pad is in the protruding position, the boat is restrained from sliding across the support surface due to the relatively high frictional forces between the pressure/gripping pad and the boat hull.

Pressure pad 64 is preferably constructed of a relatively pliable rubber material which has a higher coefficient of friction than the material from which the support surface is constructed. In this embodiment, the pressure pad is sufficiently flexible so that it substantially conforms to the shape of the hull when the pressure pad is moved to the protruding position in contact with the hull. In addition, the gripping surface may be generally concave to conform to the surface of the hull. In an alternative embodiment, gripping surface 70 includes a tacky material configured to at least partially bond to the boat and restrain it from sliding across the support surfaces.

As depicted in FIGS. 1–2, the perimeter 78 of gripping surface 70 is within the perimeter 80 of the support surface. It will be appreciated, however, that the pressure pad may be disposed in other locations relative to the support surface so that the gripping surface perimeter 78 is only partially within the perimeter 80 of the support surface. As another alternative, the pressure pad may be disposed spaced away from the support surface so that perimeter 78 not within perimeter 80. As a further alternative, the perimeter of the support surface may be within the perimeter of the gripping surface.

As described above, the invented boat rack provides an easy to use apparatus for safely carrying a boat on a vehicle. The boat may be loaded or unloaded onto the boat rack by sliding the boat into position so that it is supported in a stable configuration adjacent the vehicle. The pressure pads are then moved to the protruding position so that the gripping surfaces contact the boat to restrain it from sliding across the mounts. Finally, securing member 32 is connected to hold the boat against the support surfaces, thus preventing the boat from being dislodged from the mounts. The invented boat rack is easily mountable adjacent a variety of vehicles and is configurable to receive and support a wide array of water craft having various sizes and shapes.

Securing member 32 typically includes at least one strap 82 which passes around the boat and holds the boat against the support surface when the strap is tightened. In the embodiment depicted in FIG. 1, securing member 32 includes a first strap 82 anchored to one mount, and a second strap 84 anchored to a different mount on the opposite side of the boat. The straps extend over the deck of the boat and are joined by a buckle 88. Straps 82 and 84 may be constructed of nylon or any of several other well known natural or synthetic materials.

Referring now to FIGS. 2, 4, 6, and 8, the first end of each strap is attached to a cleat 94 configured to releasably engage the mount so that the strap is connected to the mount. Cleat 94 includes a body 96 connected to an anchor 98. The anchor is a generally elongate bar having opposite ends embedded in body 96. Preferably, straps 82 and 84 are attached or coupled to cleats 94 by sewing the straps around anchors 98. Each mount 28 includes a cleat cavity 100 configured to receive the cleat and prevent the cleat from being pulled through the support region. Adjacent the cleat cavity is a lower strap-receiving aperture 102 with spaced-apart edges. Straps 82 and 84 are adapted to be received in aperture 102 and extend into conduit 61. The periphery of body 96 is configured to extend beyond the edges of the aperture to prevent the cleat from passing through the aperture while the strap is coupled to anchor 98 and received in the aperture.

Figures 4, 5:
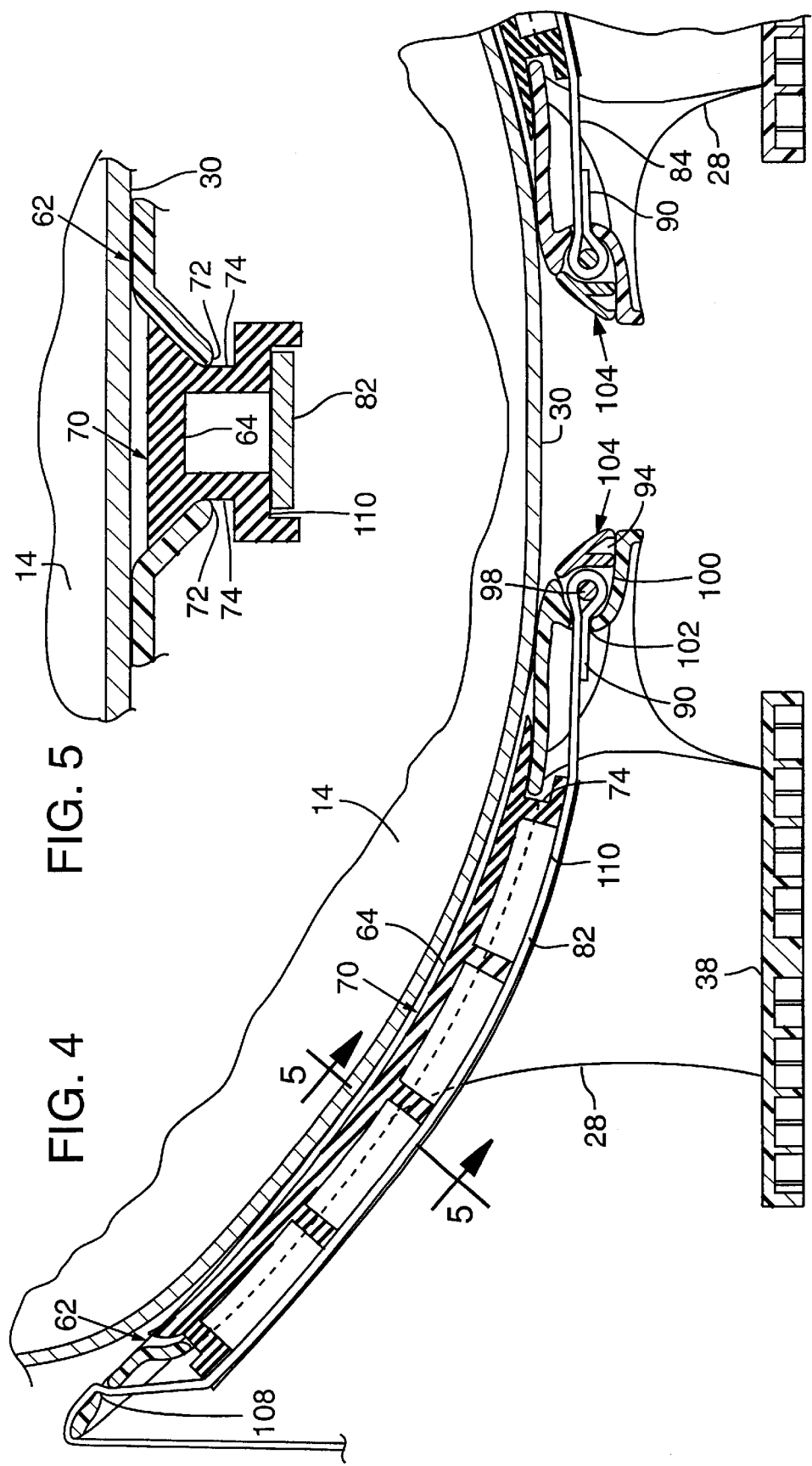
FIG. 4 is a cross-sectional view of one mount and a portion of an opposing mount, taken substantially along the line 4—4 of FIG. 2, and including a fragmentary view of the hull of the boat. The strap is shown hanging loose so that the pressure pad is in a recessed position spaced away from the hull.
FIG. 5 is an enlarged, partial view taken substantially along line 5—5 of FIG. 4, showing the boat supported by the support surface, and showing the pressure pad recessed within the slot.
Figure 8:
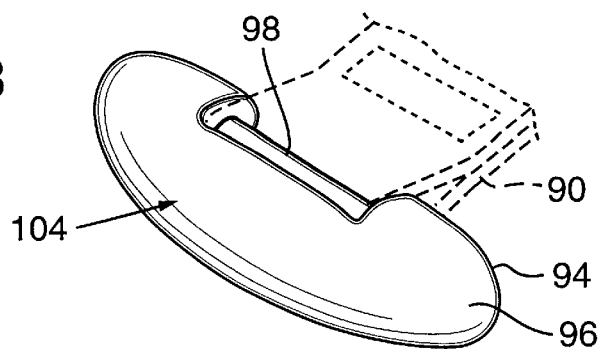
FIG. 8 is an isometric view of the cleat with the strap indicated in dashed lines.

In the embodiment depicted in FIGS. 4 and 6, cleat 94 is configured to fit entirely within and substantially fill cavity 100 when the strap is received in the aperture. Body 96 includes a face 104 adapted to form part of the support region when the cleat is received into the cleat cavity. Face 104 is preferably shaped to conform to the shape of the support region adjacent cleat cavity 100. It will appreciated that cleat cavity 100 may alternatively be disposed on the mount so that the face of the cleat forms a part of support surface 62. As a further alternative, the cleat cavity may be disposed on the mount so that the face of the cleat forms no part of the support region.

While the straps have been described above as being anchored to the mounts with cleats, it will be appreciated that other methods of anchoring the straps are possible and within the scope of the invention. As one example, first ends 90 may be attached directly to the mounts using screws or by sewing the straps around a portion of the mount. As another example, a single strap may be used and fed through the conduits in the opposing mounts, so that opposite ends of the strap extend around the hull and deck of the boat and are attached by buckle 88. Further, the first ends of the straps may alternatively be anchored to the roof rack or to the vehicle.

In the depicted embodiment, each mount includes an upper strap-receiving aperture 108 sized to receive the second end of a strap. Aperture 108 is preferably formed as a substantially C-shaped hole in the upper portion of the support region, allowing the strap to be inserted easily into the aperture. The upper strap-receiving aperture is positioned to guide the strap into a channel 110 on the bottom of pressure pad 64. Thus, the first and second straps pass beneath channels 110 and through apertures 108 so that, when the straps are tightened, they press upward into the channels and move the pressure pads from the recessed positions to the protruding positions. In addition, the flexibility of the straps encourages the pressure pads to conform to the hull of the boat.

As shown in FIGS. 4 and 5, when the strap is not tight, the pressure pad hangs from the edges of slot 68 in the recessed position so that the gripping surface is spaced away from the hull. This allows the boat to be slid into position on the mounts. The weight of the boat is supported by the support surfaces. Referring now to FIGS. 6 and 7, once the boat is properly positioned, the straps are tightened around the pressure pad and the boat, thereby pressing the gripping surface into contact with hull of the boat. The straps hold the boat against the support surfaces to prevent the boat from being lifted, blown, or bounced from the mounts. The straps also hold the gripping surface against the boat to prevent the boat from sliding across the support surface. Additionally, the pressure pad acts as a cushion between the strap and the hull of the boat.

In the depicted embodiment, the pressure pads are moved from the recessed position to the protruding position when the securing member is tightened around the pressure pad and boat. However, it will be appreciated that there are many alternative methods for selectively engaging the pressure pad with the boat, which are within the scope of the invention. As one example, once the boat is positioned on the boat rack, the support surface may be lowered in relation to the gripping surface, thereby bringing the hull into contact with the gripping surface and restraining the boat from sliding across the support surface. As another example, the pressure pad may be pressed into the protruding position by hand and held in place with a movable bracket.

Figure 9:
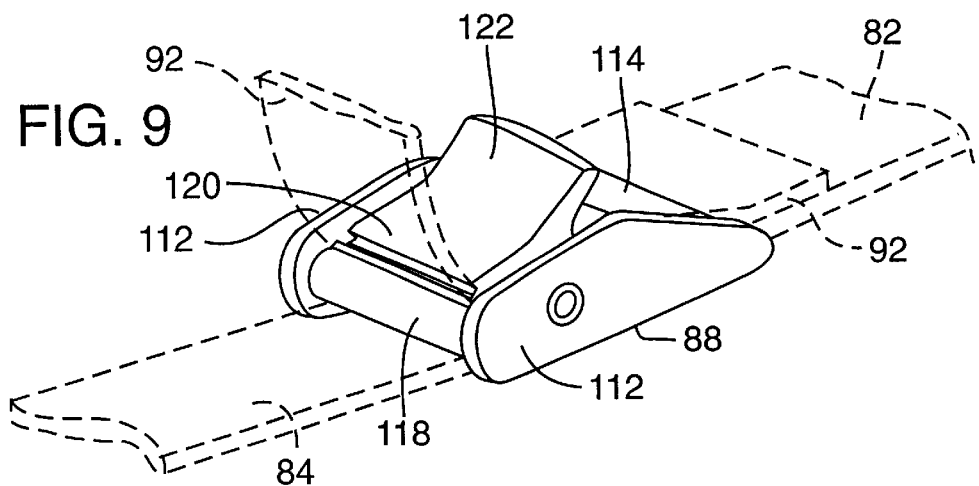
FIG. 9 is an isometric view of the buckle with the straps indicated in dashed lines.

As described above, second ends 92 of the first and second straps pass around the deck of the boat and are joined by buckle 88. In the depicted embodiment shown in FIGS. 9 and 11, buckle 88 includes sides 112 joined by a buckle anchor 114 and a slide bar 118. The second end of the first strap is attached to buckle anchor 114, while the second end of the second strap is received into the buckle between slide bar 118 and pivoting clamp 120. The slide bar includes a serrated edge 124. Similarly, the pivoting clamp includes an opposing serrated edge 128.

The clamp is pivotal so that the strap may be easily fed into the buckle in one direction. Conversely, the strap is gripped between the clamp and slide bar when the strap is pulled in the opposite direction. In a preferred embodiment, the pivoting clamp is spring-loaded to press the serrated edge of the clamp against the serrated edge of the slide bar. Buckle 88 also includes a lever 122 attached to clamp 120 which allows a user to actuate the clamp and release the strap. Buckle 88 is typically constructed of a relatively high strength material such as steel, aluminum, plastic, etc.

While a particular buckle has been described above for joining the first and second straps, it will be appreciated that there are many suitable buckles and other devices for connecting two straps which are within the scope of the invention. Alternatively, the straps may be attached using a hook-and-loop attachment, such as VELCRO, or by tying the straps together. Furthermore, while the straps are described and depicted as being attached to the cleat and buckle anchors by sewing one end of a strap around the anchors, it will be appreciated that other attachment methods are included within the scope of the invention. As one example, a strap may be passed around both the cleat and buckle anchor, and then the opposing ends of the strap sewn together to form a loop. This embodiment provides a double-thickness strap while allowing the cleat and buckle to slide along the strap.

In the depicted embodiment, apparatus 10 includes a protective device such as buckle housing 130 configured to protect the boat against damage from the buckle, and vice versa. Housing 130 is typically constructed of rubber or some other relatively soft material to act as a cushion between the buckle and the boat. One material which has been found to be suitable is Kraton® 7720, available from GLS Corporation of McHenry, Ill. (Kraton is a registered trademark of Shell Oil Company of Houston, Tex.) It will be appreciated, however, that there are many other suitable materials within the scope of the invention.

Figure 10:
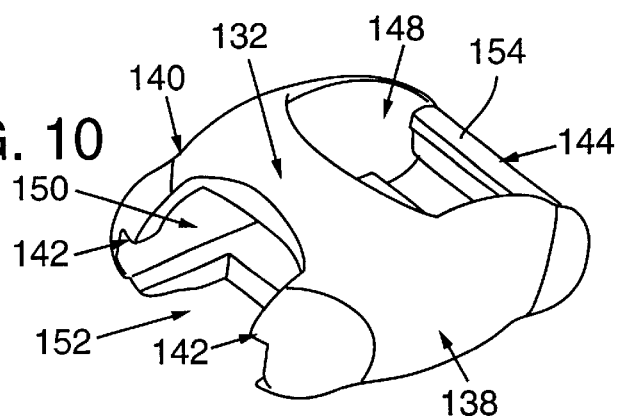
FIG. 10 is an isometric view of the buckle protective housing.
Figure 11:
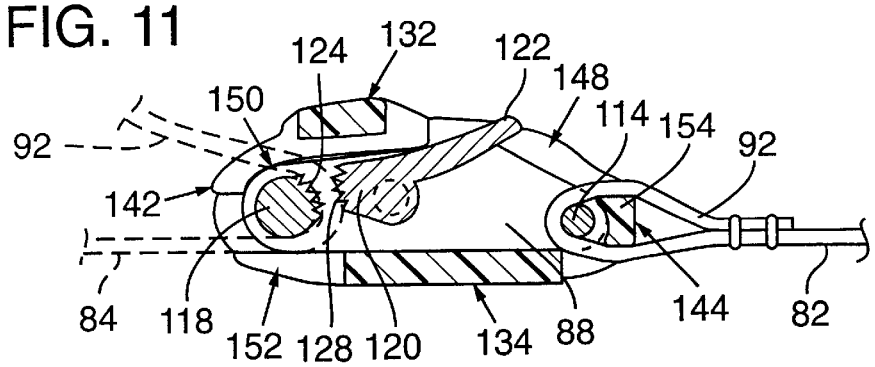
FIG. 11 is a cross-sectional view of the buckle and protective housing taken substantially along the elongate axis of the strap, showing one strap sewn around the buckle anchor and housing anchor, and another strap (indicated by dashed lines) gripped by the clamp.

As shown in FIGS. 10 and 11, buckle housing 130 is adapted to receive and at least partially cover buckle 88. The buckle housing includes a top surface 132, a bottom surface 134, a left side surface 138, and a right side surface 140. The left and right side surfaces are disposed adjacent sides 112 of the buckle. The buckle housing also includes a front side surface 142 disposed adjacent slide bar 118, and a rear side surface 144 disposed adjacent buckle anchor 114.

When installed on the buckle, the housing defines an access hole 148 adjacent lever 122 to allow a user to operate the lever to release the clamp. Access hole 148 extends through at least a portion of top surface 132 and at least a portion of rear side surface 144. Alternatively, the access hole may extend through side surfaces 138, 140, and/or 142, depending on the configuration of lever 122. By extending through at least a portion of a side surface, access hole 148 allows a user to press his or her thumb between the sides of the housing and buckle and apply full pressure to the lever with the bottom of the thumb.

The extension of the access hole over a side of the housing has many benefits. For example, a user with long fingernails may operate the lever because their thumb may be oriented parallel with, rather than perpendicular to, the lever. In addition, a user may employ the relatively strong muscles of the hand which cause the thumb to press inward against the palm. As a result, the spring (not shown) which biases the clamp against the slide bar may be constructed to be stiffer, thereby improving the gripping action of the buckle. Access hole 148 may also be thought of as a recessed region in top surface 132 adjacent the rear end of housing 130. Recessed region 148 exposes lever 122 to allow a user to operate the lever when the buckle is covered by the housing.

An upper strap hole 150 extends through at least a portion of top surface 132 adjacent the slide bar. Similarly, a lower strap hole 152 extends through at least a portion of bottom surface 134 adjacent the slide bar. The upper and lower strap holes are adapted to receive the strap into, and out of, the buckle. Typically, the strap is fed into the buckle through the lower strap hole, between the clamp and slide bar, and out through the upper strap hole. Alternatively, the strap may be fed into the upper strap hole and out through the lower strap hole.

Upper strap hole 150 may also be thought of as a recessed region in top surface 132 adjacent the front end of housing 130. Similarly, lower strap hole 152 may also be thought of as a recessed region in bottom surface 134 adjacent the front end of housing 130. Recessed regions 150 and 152 expose slide bar 118 and pivoting clamp 120 to allow a user to insert the strap into the buckle when the buckle is covered by the housing.

In one embodiment, rear side surface 144 forms a housing anchor 154 between the left and right side surfaces. Housing anchor 154 is disposed adjacent buckle anchor 114 so that the strap may be connected to both the buckle anchor and housing anchor simultaneously to prevent the buckle and housing from being separated from the housing. The strap is typically sewn around the buckle anchor and housing anchor as shown in FIG. 11. Alternatively, the strap may be attached to the buckle and housing anchors by screws, etc. The strap may be attached in a loose loop around buckle anchor 114 and housing anchor 154 to allow the buckle to be removed at least partially from the housing, as shown in FIG. 12. Typically, housing 130 is sufficiently flexible that front side surface 142 flexes aside to allow the buckle to slide out the housing. Although strap 82 is shown attached to buckle anchor 114 and housing anchor 154 with a relatively small loop in FIG. 12, it will be appreciated that strap 82 may be formed in a relatively large loop to allow the buckle to be completely removed from the housing. Alternatively, the strap may be attached in a relatively tight loop to substantially prevent the buckle from being removed from the housing.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A protective device for a buckle, where the buckle has a clamp actuated by a lever and is configured to releasably grip a strap, the device comprising:
    a housing adapted to receive and at least partially cover the buckle, the housing including a top surface and a side surface; and
    wherein the housing defines an access hole adjacent the lever to allow a user to operate the lever, the access hole extending through at least a portion of the top surface and at least a portion of the side surface.

2. The device of claim 1, wherein the housing further defines an upper strap hole adapted to receive the strap and extending through at least a portion of the top surface.

3. The device of claim 1, wherein the housing includes a bottom surface opposite the top surface, and wherein the housing further defines a lower strap hole adapted to receive the strap and extending through at least a portion of the bottom surface.

4. The device of claim 1, wherein the buckle has a buckle anchor attachable to a different strap, and wherein the housing includes a housing anchor adjacent the buckle anchor and attachable to the different strap.

5. An apparatus for securing articles to a vehicle-mounted rack, comprising:
    at least one flexible strap associated with the rack and positionable around an article supported by the rack;
    a clamping buckle adapted to receive and clamp onto the at least one strap; and
    a protective housing adapted to receive and at least partially cover the buckle;
    where the at least one strap is attached to the housing to prevent the housing from being separated from the strap.

6. The apparatus of claim 5, wherein the buckle includes a buckle anchor and the housing includes a housing anchor, and wherein the at least one strap is attached to the buckle anchor and the housing anchor.

7. The apparatus of claim 6, wherein the strap is formed in a loose loop around the buckle anchor and the housing anchor to allow the buckle to be removed from the housing.

8. The apparatus of claim 7, wherein the buckle includes a clamp actuated by a lever configured to clamp onto the at least one strap, and wherein the housing includes an access hole adjacent the lever to allow a user to operate the lever when the buckle is received in the housing.

9. An apparatus for securing articles to a vehicle-mounted rack, comprising:
- at least one flexible strap associated with the rack and positionable around an article supported by the rack;
- a clamping buckle adapted to receive and clamp onto the at least one strap; and
- a protective housing comprised of a cushioning material having top and bottom surfaces extending between forward and rear ends, where the housing is adapted to receive and cover the buckle to prevent damage to the article from the buckle;
- where at least one of the top or bottom surfaces includes a recessed region adjacent the forward end of the housing to expose a portion of the buckle when the buckle is covered by the housing.

10. The apparatus of claim 9, wherein both the top and bottom surfaces include recessed regions adjacent the forward end.

11. The apparatus of claim 9, wherein the buckle includes a clamp actuated by a lever, and where the top surface includes a recessed region adjacent the rear end to expose the lever when the buckle is covered by the housing.

12. An apparatus for securing articles to a vehicle-mounted rack, comprising:
- at least one flexible strap associated with the rack and positionable around an article supported by the rack;
- a clamping buckle adapted to receive and clamp onto the at least one strap;
- a protective housing having top and bottom surfaces extending between forward and rear ends, where the housing is adapted to receive and cover the buckle to prevent damage to the article from the buckle; and
- wherein the buckle includes a clamp actuated by a lever, the top surface of the housing having a recessed region permitting access to the lever.

* * * * *